(12) United States Patent
Anglin et al.

(10) Patent No.: US 10,303,882 B2
(45) Date of Patent: *May 28, 2019

(54) IMPLEMENTING LOCALE MANAGEMENT ON PAAS: LOCALE REPLACEMENT RISK ANALYSIS

(71) Applicant: International Business Machines Corporation, Armonk, NY (US)

(72) Inventors: Debbie A. Anglin, Austin, TX (US); Vishal C. Aslot, Austin, TX (US); Yu Gu, Cedar Park, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,946

(22) Filed: Jul. 10, 2018

(65) Prior Publication Data
US 2018/0322290 A1 Nov. 8, 2018

Related U.S. Application Data

(63) Continuation of application No. 15/243,821, filed on Aug. 22, 2016, now Pat. No. 10,102,376.

(51) Int. Cl.
| | | |
|---|---|---|
| *H04L 29/06* | (2006.01) | |
| *G06F 21/57* | (2013.01) | |
| *G06F 17/30* | (2006.01) | |
| *G06F 8/65* | (2018.01) | |
| *G06F 9/451* | (2018.01) | |

(52) U.S. Cl.
CPC ............... *G06F 21/57* (2013.01); *G06F 8/65* (2013.01); *G06F 9/454* (2018.02); *G06F 17/30702* (2013.01); *H04L 63/1433* (2013.01)

(58) Field of Classification Search
CPC ...... G06F 21/57; G06F 8/65; G06F 17/30702; H04L 63/1433
USPC ...................................................... 726/22–25
See application file for complete search history.

(56) References Cited

U.S. PATENT DOCUMENTS

| | | |
|---|---|---|
| 6,408,333 B1 | 6/2002 | St. Clair |
| 6,535,227 B1 | 3/2003 | Fox et al. |
| 7,013,395 B1 | 3/2006 | Swiller et al. |
| 7,363,487 B2 | 4/2008 | Venkataramappa et al. |
| 7,409,721 B2 | 8/2008 | Hernacki et al. |
| 7,774,195 B2 | 8/2010 | Kohlmeier et al. |

(Continued)

OTHER PUBLICATIONS

List of IBM Patents or Patents Applications Treated as Related, Jul. 11, 2018.

(Continued)

*Primary Examiner* — Hosuk Song
(74) *Attorney, Agent, or Firm* — Joan Pennington

(57) ABSTRACT

A method and apparatus are provided for implementing system locale management including locale replacement risk analysis in a computer system. A Locale Update Risk Analysis Agent (RAA) scans globalization API usages on each pair of locale and running application. The scanned API list of each running application is compared with predefined API locale sensitive weights, and a locale replacement risk index is calculated on each application under a certain locale. A living locale-object update decision is made based on the calculated locale replacement risk indexes.

17 Claims, 8 Drawing Sheets

(56) References Cited

U.S. PATENT DOCUMENTS

| | | |
|---|---|---|
| 7,818,736 B2 | 10/2010 | Appavoo et al. |
| 7,913,235 B2 | 3/2011 | Rose et al. |
| 8,261,353 B2 | 9/2012 | Hirsave et al. |
| 8,510,371 B2 | 8/2013 | Peled |
| 8,745,088 B2 * | 6/2014 | Balakrishnaiah ..... G06F 21/577 |
| | | 707/706 |
| 9,141,352 B2 | 9/2015 | Bromley, Jr. et al. |
| 9,349,012 B2 * | 5/2016 | Yasuda ................. G06F 21/577 |
| 9,386,044 B2 | 7/2016 | Dulkin et al. |
| 9,507,944 B2 | 11/2016 | Lotem et al. |
| 9,729,558 B2 | 8/2017 | Liu et al. |
| 9,910,666 B1 * | 3/2018 | Anglin ................... G06F 8/656 |
| 10,102,376 B2 * | 10/2018 | Anglin ................... G06F 21/57 |
| 2013/0174136 A1 | 7/2013 | Atkin et al. |
| 2015/0089375 A1 | 3/2015 | Liu et al. |
| 2015/0116329 A1 | 6/2015 | Barrat et al. |
| 2015/0169317 A1 | 6/2015 | Barrat et al. |
| 2015/0268947 A1 | 10/2015 | Ionescu |
| 2016/0050225 A1 | 2/2016 | Carpenter et al. |

OTHER PUBLICATIONS

Arnold, J. B., "Ksplice: An automatic system for rebootless kernel security updates" (Doctoral dissertation, Massachusetts Institute of Technology), 2008.

Vaughan-Nichols, S. J., "KernelCare: New no-reboot Linus patching system", ZDNet, Jul. 2014.

Darvell, J. "No Reboot" Kernel Patching- and Why You Should Care, Ninux Journal, Apr. 2015.

\* cited by examiner

100

---

SYSTEM MEMORY 106

(LOCALE OBJECT REPLACEMENT
RISK ANALYSIS METHOD)

- LOCALE UPDATE RISK ANALYSIS AGENT (RAA)
  150

- GENERAL GLOBALIZATION API LIST (GGAPIL)
  152

- LOCALE REPLACEMENT RISK EXAMINER (LRRE)
  154

- RUNNING APPLICATION STATUS FILE (RASF)
  156

- LIVING LOCALE OBJECT UPDATE PROFILE (LLOU)
  158

- LOCALE OBJECT MANAGEMENT DAEMON (LOMD)
  160

- TABLE OF RUNNING APPLICATIONS AND CORRELATED
  LOADED LOCAL-OBJECTS
  (TRACLLO)
  162

FIG. 2

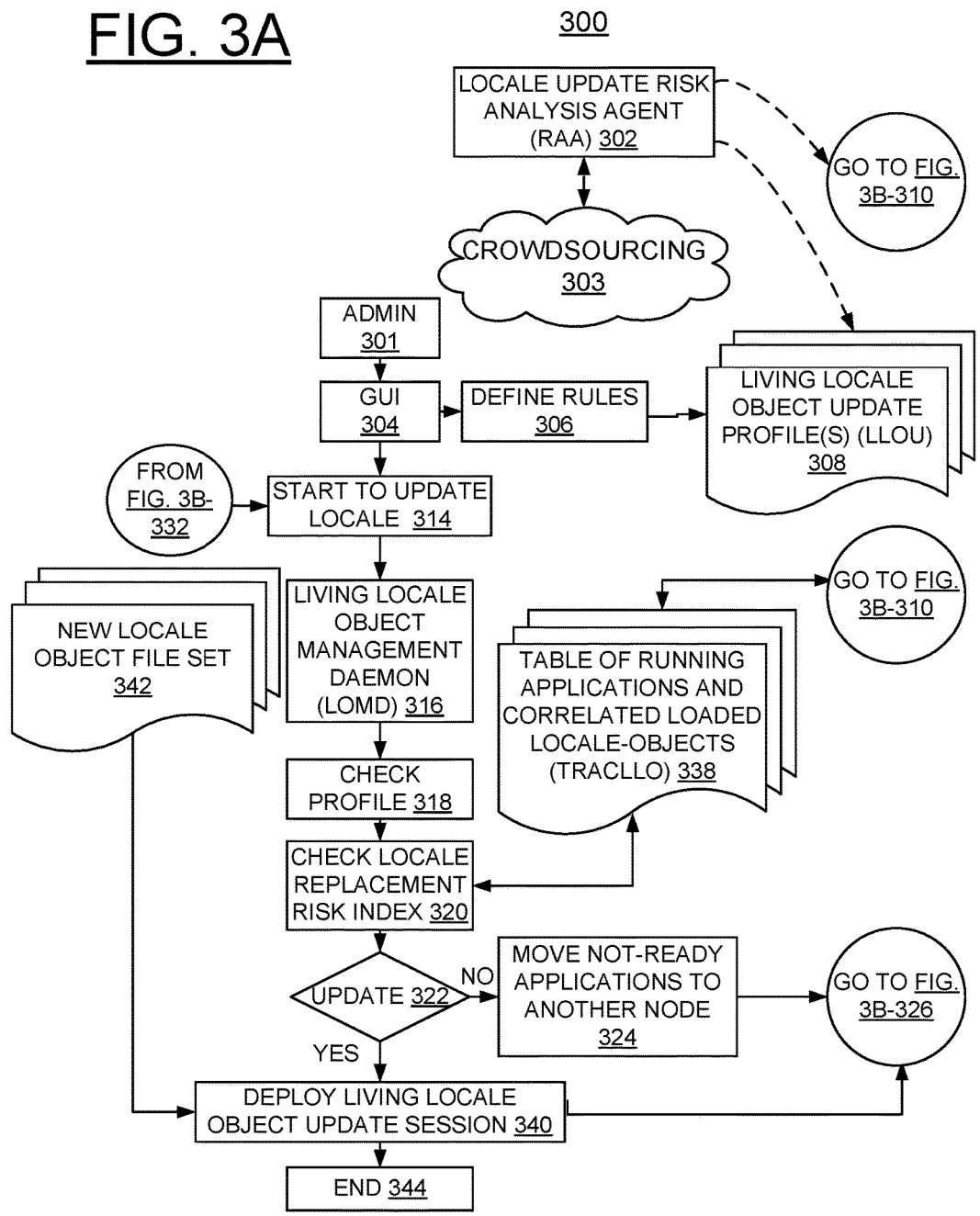

500

| CTYPE | CTYPE | TIME/ MONETARY | CODESET | MESSAGES |
|---|---|---|---|---|
| ISALNUM | ISDIGIT | STRFMON | MLEN | CATOPEN |
| ISUPPER | ISXDIGIT | STRTIME | WCTOMB | CATGETS |
| ISLOWER | ISASCII | STRPTIME | MBTOWC | CATCLOSE |
| ISSPACE | TOLOWER | | ICONV_OPEN | |
| ISPUNCT | TOUPPER | | ICONV | |
| ISPRINT | TOASCII | | ICON_CLOSE | |
| ISGRAPH | STRCMP | | | |
| ISCNTRL | STRCOL | | | |

FIG. 5

IMPLEMENTING LOCALE MANAGEMENT ON PAAS: LOCALE REPLACEMENT RISK ANALYSIS

This is a continuation application of Ser. No. 15/243,821 filed Aug. 22, 2016.

FIELD OF THE INVENTION

The present invention relates generally to the data processing field, and more particularly, relates to method and apparatus for implementing system locale management including locale replacement risk analysis in a computer system.

DESCRIPTION OF THE RELATED ART

In an enterprise computing service, such as Platform as a Service (PaaS) or cluster, providing multicultural enablement support is one of critical features for supporting thousands of running application sessions under different languages, locales, and geographical locations.

In computing, a locale is a set of parameters that defines the user's language, region and any special variant preferences, collation, and regular expression rules that the user wants to see in their user interface. Usually a locale identifier consists of at least a language identifier and a region identifier.

Multicultural operating systems and applications use locales to determine the manner by which they perform processing on data, both with regard to inputs and outputs. The locale used by a multicultural operating system is typically represented as an object file that is used to identify a set of cultural conventions. These cultural conventions include, for example, information on collation, character classification, date/time format, monetary symbols, and numeric representations. In a multicultural operating system, a set of locale variables can be used to specify a user preferred language and culture environment. A multicultural application environment may be initialized, for example, by the Application Programming Interface (API), such as the setlocale ( ) API, to load the defined locale object from a specified path.

Each running OS system has a primary locale and multiple user/application selectable locales to serve different users and software applications for different regions and cultures. A single node of an Advanced Interactive Executive (AIX®) operating system (OS) available from International Business Machines Corporation of Armonk, N.Y., supports, for example, 81 languages and more than 600 locale objects, simultaneously.

Common Locale Data Repositories (CLDR), an IT standard, updates and changes locale names and locale definitions each year. More than 20-50% locale data including culture definitions and conventional rules, are updated every year by CLDR. Also, locale names can be changed often due to various reasons.

After changing locale names and locale definitions, OS vendors need to update locale contents; rebuild locale objects; ship updated locale file-sets; and update locales objects on the OS systems. After installing new updated system locales, system administrators usually need to reboot updated systems. After installing new updated system locales, there are risks to change application behaviors because of locale data changes. Risks result from collation rule changes; regular expression changes; and data output format changes. Modern technologies (such as logical partition and work load manager) can handle live application update and may also be used to update locale-object in real time as well with a living locale-object replacement. For instance, an indiscrimination locale-object replacement on a particular locale on a running system may cause errors from inconsistent monitory format.

Currently for a user, it is not clear if any changes will impact an application behaviors before a living locale-object replacement. And, it is hard to tell if a new change of system locale definitions has been taken by which application after living locale updating. From the standpoint of PaaS users, known locale management mechanisms do not enable either a risk assessment before applying a living locale-object replacement for applications running on their PaaS platforms, or living update status analysis report for each application after each living update.

A need exists for an efficient and effective method and apparatus for implementing system locale management including locale replacement risk analysis.

SUMMARY OF THE INVENTION

Principal aspects of the present invention are to provide a method and apparatus for implementing system locale management including locale replacement risk analysis in a computer system. Other important aspects of the present invention are to provide such method and apparatus substantially without negative effects and that overcome many of the disadvantages of prior art arrangements.

In brief, a method and apparatus are provided for implementing system locale management including locale replacement risk analysis in a computer system. A Locale Update Risk Analysis Agent (RAA) scans globalization API usages on each pair of locale and running application. The scanned API list of each running application is compared with predefined API locale sensitive weights, and a locale replacement risk index is calculated on each application under a certain locale. A living locale-object update decision is made based on the calculated locale replacement risk indexes.

In accordance with features of the invention, the locale replacement risk index is saved and the calculated locale replacement risk index is updated into one or more living locale-object update profiles and a running application status file.

In accordance with features of the invention, the updated living locale-object update profiles are shared with other nodes or platforms as crowdsourcing contribution to similar PaaS users.

In accordance with features of the invention, a locale object management daemon is invoked to make the living locale-object update decision based on the locale replacement risk indexes stored in the living locale-object update profiles.

In accordance with features of the invention, each identified not-ready living locale-object update application is moved to another node.

In accordance with features of the invention, the living locale-object update is deployed in a targeted node.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a block diagram of the memory system of the data processing computer system FIG. 1 in accordance with a preferred embodiment;

FIGS. 3A and 3B is a functional block and flow diagram illustrating a high level system design framework and operations in accordance with a preferred embodiment;

FIG. 5 is a chart illustrating an example General Globalization API list (GGAPIL) in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and computer system are provided for implementing system locale management. Running time locale object replacement risk analysis is defined for running applications on OS level for determining if a current system is ready for living locale update on a certain threshold of running application status.

Figure 1:
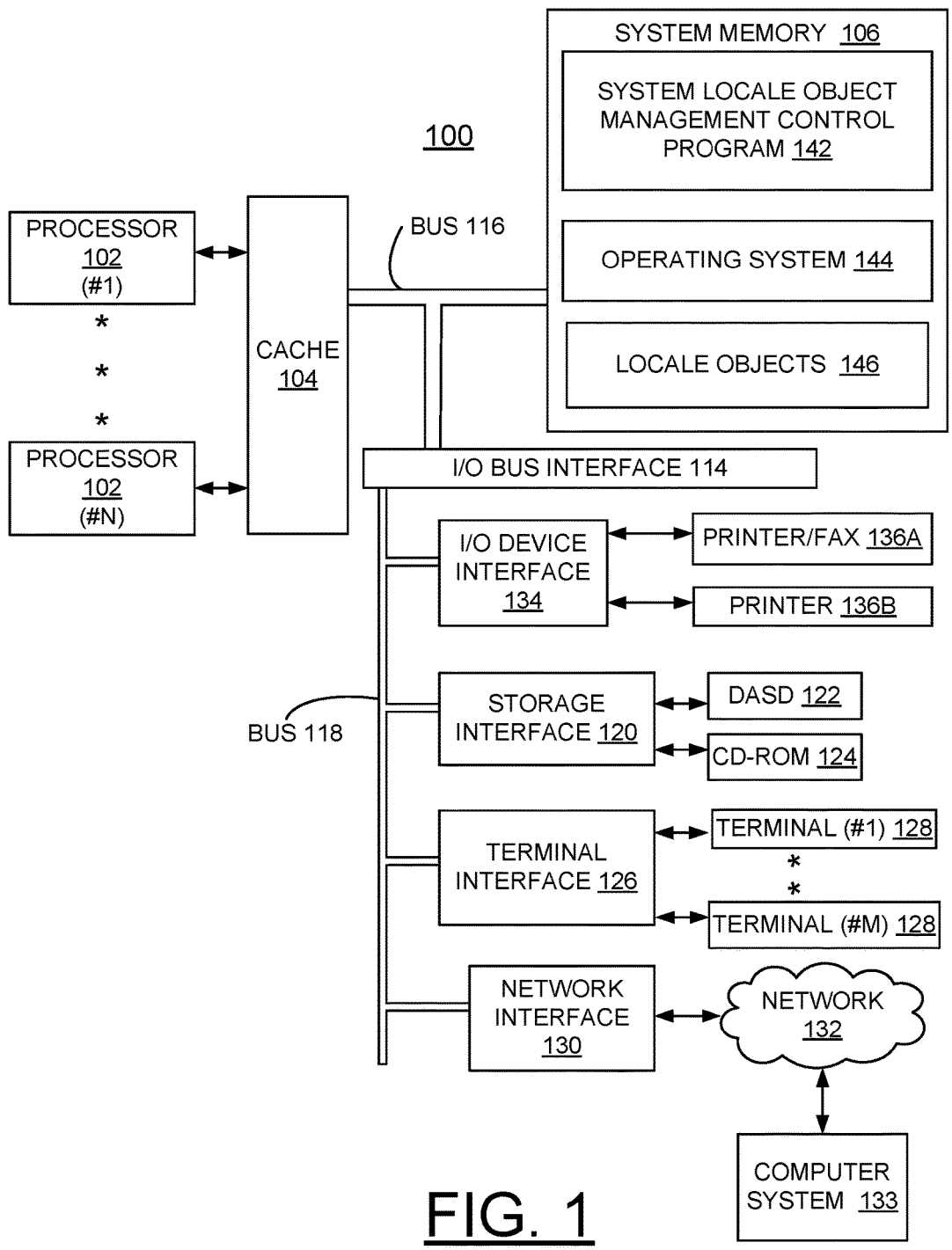
FIG. 1 is a block diagram of an example data processing computer system for implementing system locale management in accordance with a preferred embodiment.

Having reference now to the drawings, in FIG. 1, there is shown a data processing computer system embodying the present invention generally designated by the reference character 100 for implementing system locale management including locale replacement risk analysis in accordance with the preferred embodiment. Data processing computer system 100 includes one or more processors 102 or general-purpose programmable central processing units (CPUs) 102, #1-N. As shown, data processing computer system 100 includes multiple processors 102 typical of a relatively large system; however, system 100 can include a single CPU 102. Computer system 100 includes a cache memory 104 connected to each processor 102.

Data processing computer system 100 includes a system memory 106. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components.

Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, data processing computer system 100 includes a storage interface 120 coupled to storage devices, such as, a direct access storage device (DASD) 122, and a CD-ROM 124. Data processing computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores a system locale object management control program 142 for implementing system locale management including locale replacement risk analysis in accordance with the preferred embodiments, an operating system 144 and locale objects 146 in accordance with the preferred embodiments.

Data processing computer system 100 may be, for example, an IBM® eServer™ System P® computer system, running the Advanced Interactive Executive (AIX®) operating system or the LINUX® operating system. Data processing system 100 may be a symmetric multiprocessor (SMP) system including the plurality of processors 102.

In accordance with features of the invention, a locale management method is provided for living locale update with a pre-locale-update assessment features including locale object replacement risk analysis.

Referring to FIG. 2, there is shown an example locale object replacement risk analysis method stored in memory system 106 of the data processing computer system 100 in accordance with a preferred embodiment. The method comprises (for each application n), Locale Update Risk Analysis Agent (RAA) 150, General Globalization API List (GGAPIL) 152, Locale Replacement Risk Examiner (LRRE) 154, Running Application Status File (RASF) 156, Living Locale-Object Update Profiles (LLOU) 158, Living Locale-Object Management Daemon (LOMD) 160, and a Table of Running Applications and Correlated Loaded Locale-Objects (TRACLLO) 162. The Locale Update Risk Analysis Agent (RAA) 150 illustrated in FIGS. 3A and 3B can scan globalization API usages each pair of locale and running applications, compare scanned API list of each running application with predefined API locale sensitive weights, and calculate a locale replacement risk index on each application under a certain locale, save and update the calculated locale replacement risk index into living locale-object update profile(s) and running application status file share the updated living locale-object update profile(s) with other nodes or platforms as crowdsourcing contribution to similar PaaS users, invoke a locale object management daemon to make living locale-object update decision based on the locale replacement risk indexes stored in the living locale-object update profiles, determine non-ready living locale-object update applications to another node and deploy living locale object update in the targeted node.

The General Globalization API List (GGAPIL) 152 illustrated in FIG. 5 including an example list of globalization APIs such as widely used in globalized application, with most of globalization APIs being locale sensitive. However, each API of General Globalization API List (GGAPIL) 152 may have different locale sensitive level according to application type, business cases, and/or users after locale update. Each API may be rated in different risk levels based upon selected parameters, such as language, locale names, customer geographic location, and multiple other factors.

Figure 4A:
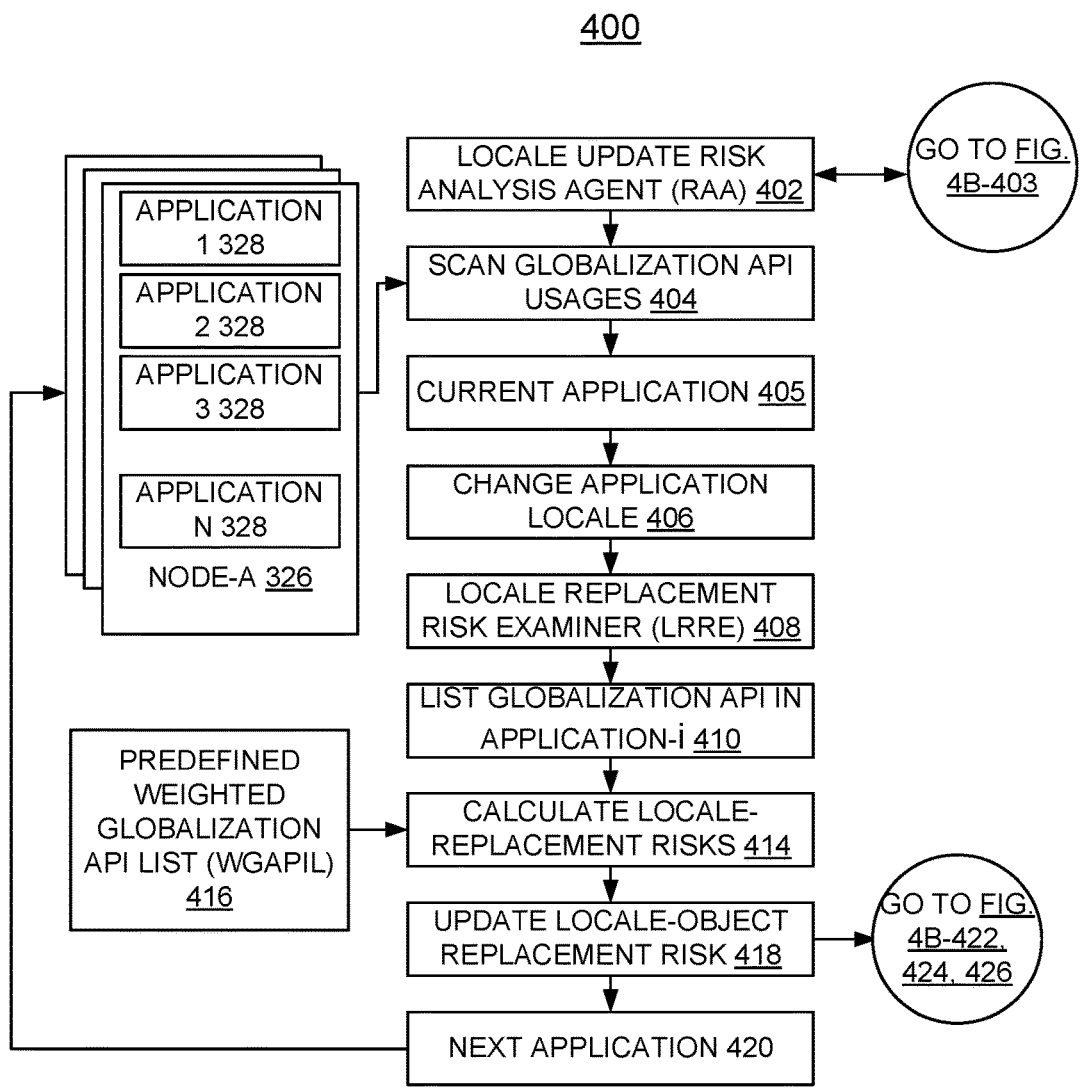
FIGS. 4A and 4B is a functional block and flow diagram illustrating risk assessment for living locale-object update in accordance with a preferred embodiment.
Figure 4B:
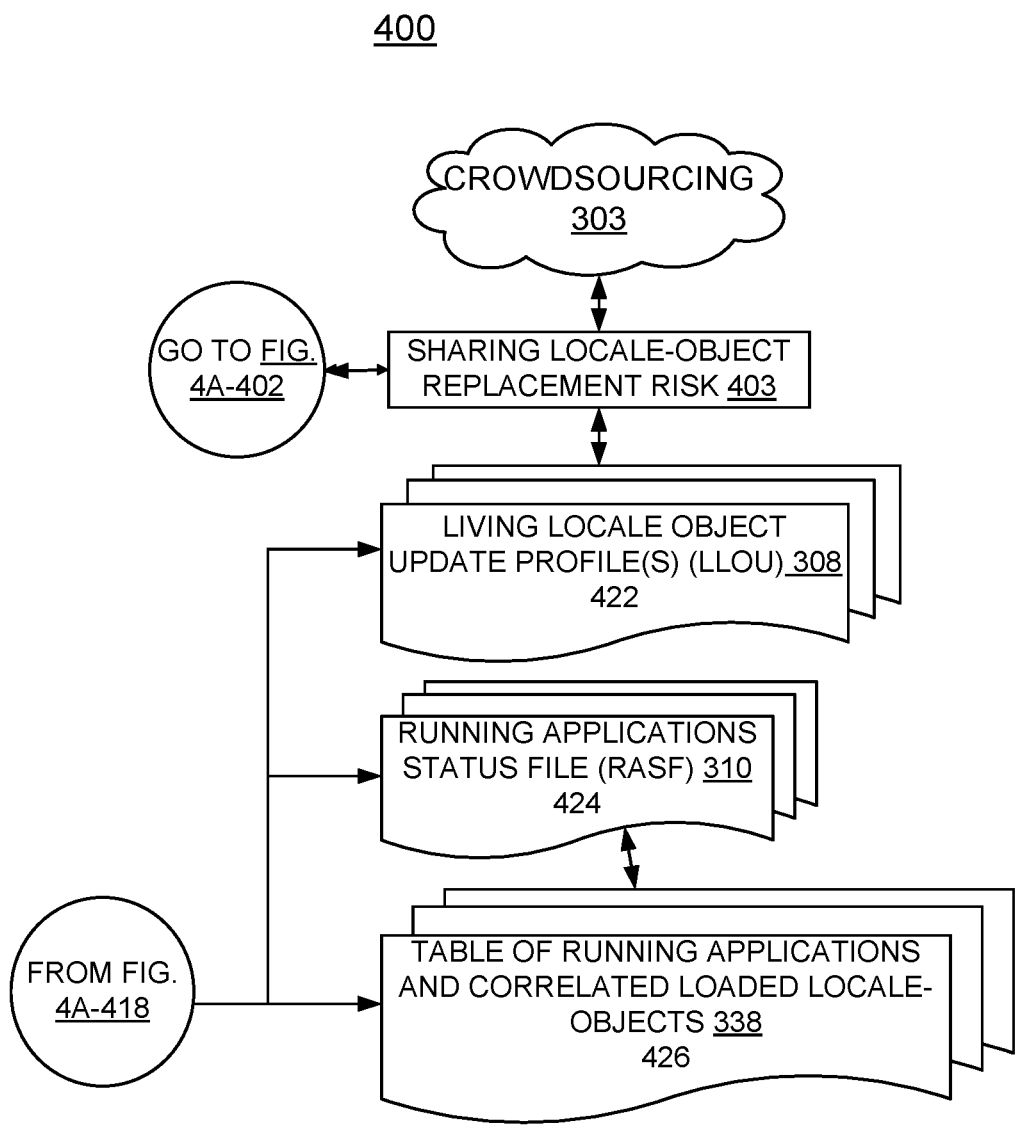

The Locale Replacement Risk Examiner (LRRE) 154 illustrated in FIGS. 4A and 4B is a module to evaluation risks of living locale-object replacement operation on certain pair of application and locale. The output LRRE can be used by the Living Locale-Object Management Daemon (LOMD) 160 for making right decision: move not-ready locale update applications to another nodes before starting a requested living locale-object operation.

Figure 3B:
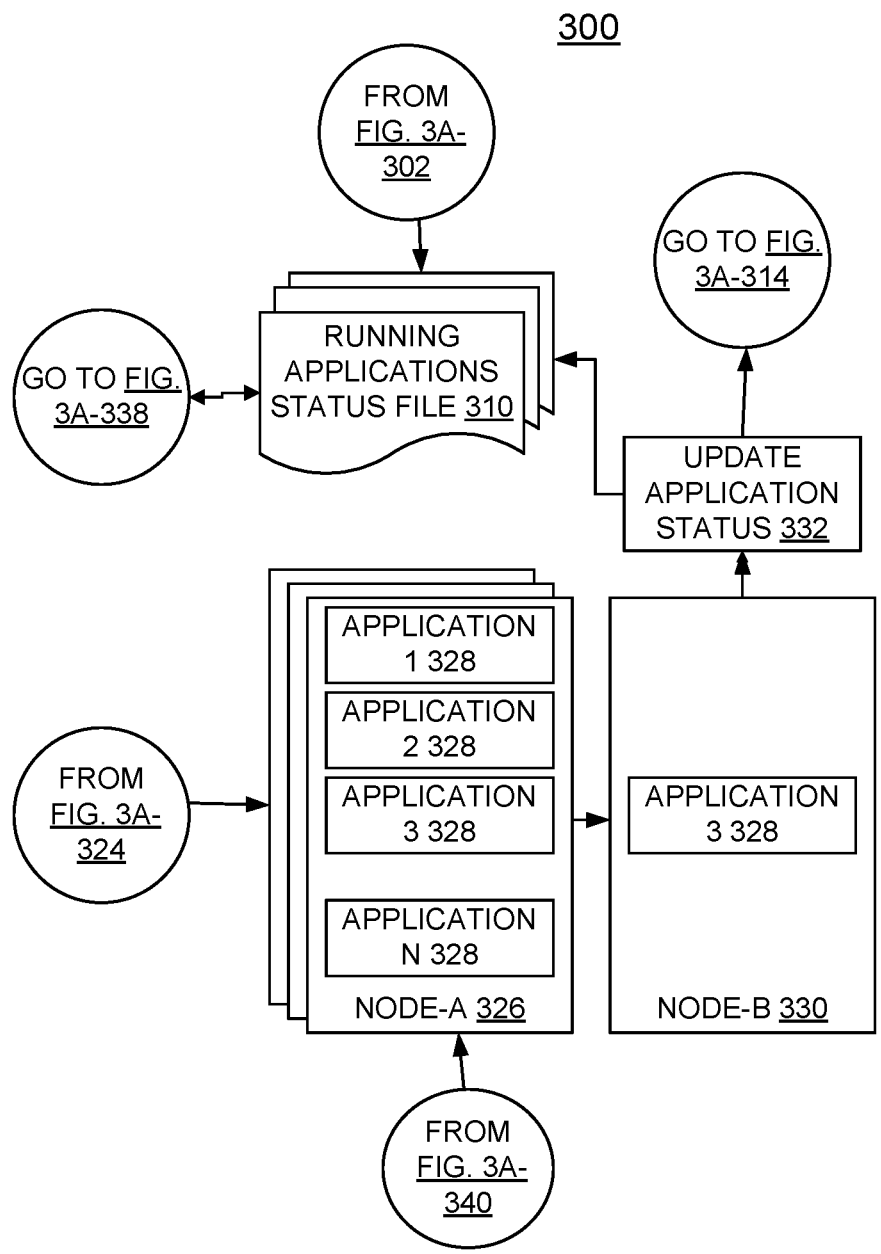

The Running Application Status File (RASF) 156 illustrated in FIGS. 3A and 3B is a status file to record all application related locale objects changes, updates, update risk score.

The Living Locale-Object Update Profiles (LLOU) 158 illustrated in FIGS. 3A and 3B is a set or records and rules in certain formats for defining rules and options of living locale object update.

The Living Locale-Object Management Daemon (LOMD) 160 illustrated in FIGS. 3A and 3B can manage operations of living locale-object update through a living locale object management GUI interface; define, delete, modify rules on living locale object update profile; and move a locale sensitive application (not ready application) to another node before deploying a living locale-object update session; and deploy a living locale object update session.

The Table of Running Applications and Correlated Loaded Locale-Objects (TRACLLO) 162 illustrated in FIGS. 3A and 3B can be a matrix which includes information of running application status under certain locales.

Referring now to FIGS. 3A and 3B, there is shown a functional block and flow diagram illustrating a high level system design framework and operations generally designated by the reference character 300 in accordance with a preferred embodiment. At a block 301, a system administrator initiates an update. At block 302, a Locale Update Risk Analysis Agent (RAA) starts and is coupled to a crowdsourcing block 303, such as, for sharing updated living locale-object update profiles with other nodes or platforms to other PaaS users. A graphical user interface (GUI) 304 is initiated with rules defined at a block 306 and applied to Living Locale-Object Update Profiles (LLOU) at a block 308. The Locale Update Risk Analysis Agent (RAA) 302 is coupled to the Living Locale-Object Update Profiles (LLOU) 308. Locale Update Risk Analysis Agent (RAA) 302 is coupled to a Running Application Status File (RASF) at block 310 in FIG. 3B.

In FIG. 3A, at a block 314 an update locale is started and applied to a Living Locale-Object Management Daemon (LOMD) at block 316. At a block 318, check profile is performed. A check locale replacement index at a block 320 is performed. Checking whether to update is performed as indicated at a decision block 322. If not, not-ready applications are moved to another node at a block 324.

In FIG. 3B, at a block 326 a node A is shown with a plurality of applications 1-N, 328 with an example application 3, 328 moved to a node B at a block 328, and coupled to an update application status at a block 332. The update application status 332 is coupled to the start to update locale at block 314 in FIG. 3A. In FIG. 3B, the update application status 332 is applied to the running applications status file 310. The running applications status file 310 is coupled to a Table of Running Applications and Correlated Loaded Locale-Objects (TRACLLO) at a block 338 in FIG. 3A.

In FIG. 3A, the Table of Running Applications and Correlated Loaded Locale-Objects (TRACLLO) 338 is applied to the check local replacement risk index 320. When update is identified at decision block 322, a living local object update session is deployed at a block 340, and a new locale object file set at a block 342 is applied. The deploy living local object update session at block 340 is coupled to the node A at block 326 with the plurality of applications 1-N, 328.

Referring now to FIGS. 4A and 4B, there is shown a functional block and flow diagram generally designated by the reference character 400 illustrating risk assessment for living locale-object update in accordance with a preferred embodiment.

In FIG. 4A, a Locale Update Risk Analysis Agent (RAA) 402 is coupled to a sharing locale-object replacement risk at a block 403 in FIG. 4B, and to scan globalization API usages at a block 404 and can scan all globalization API usages on each pair of locale and running application session. A current application at a block 405 and a change application locale at a block 406 are applied to a Local Replacement Risk Examiner (LRRE) at a block 408. A list globalization API in each running application at a block 410 is used to compare scanned API list of each running application with predefined API locale sensitive weights, and to calculate locale replacement risks or risk index at a block 414 on each application under certain locale with input from a predefined Weighted Globalization API List (WGAPIL) at a block 416. For example, a risk index could be a value in a range of 0.00-1.00. A locale-object replacement risk is updated at a block 418 and continue to blocks 422, 424, and 426 in FIG. 4B.

In FIG. 4B, at block 422, a Living Locale-Object Update Profiles (LLOU) updates and saves the calculated locale-object replacement risk, at block 424, a Running Applications Status File (RASF) updates and saves the calculated locale-object replacement risk, and at block 426, a Table of Running Applications and Correlated Loaded Locale-Objects (TRACLLO) stores information of running application status under certain locales. The Living Locale-Object Update Profiles (LLOU) 422 is applied to the sharing locale-object replacement risk at a block 403 for sharing the updated living locale-object update profiles with other nodes or platforms as crowdsourcing contribution to similar PaaS users.

In FIG. 4A, at block 420, a next application is applied to the node A, 326 of application 1-N, 328 (as shown in FIG. 3B) to deploy the living locale object update in the targeted node.

Referring to FIG. 5, there is shown a chart illustrating an example General Globalization API list (GGAPIL) generally designated by the reference character 500 in accordance with the preferred embodiment. The General Globalization API List (GGAPIL) 500 includes each API being rated in different risk levels based upon predetermined parameters. For example, the General Globalization API List (GGAPIL) 500 may have different locale sensitive level according to application type, business cases, and/or users after a locale update. For instance, API STFRMON is called by a financial application for supporting a Russian National Bank, and can be higher risk if a system administrator needs to update a Russian locale object in a targeted node. In the General Globalization API List (GGAPIL) 500 each API may be rated in different risk levels according to language and locale names, customer geographical locations, business mode, and selected other factors.

Figure 6:
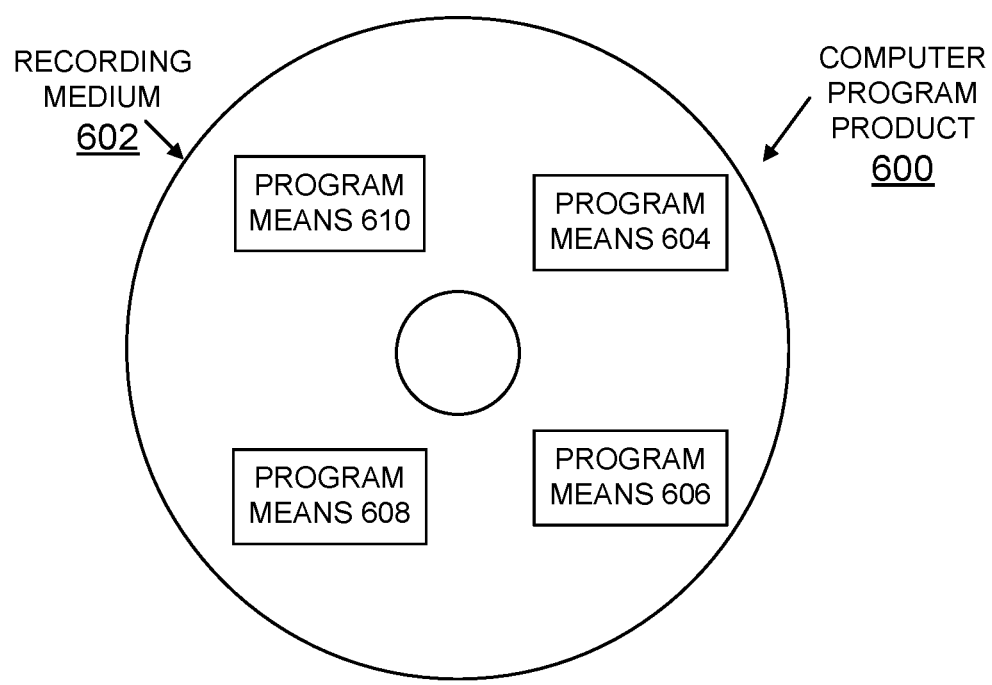
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing system locale management including locale replacement risk analysis of the preferred embodiment in the system 100 of FIG. 1.

A sequence of program instructions or a logical assembly of one or more interrelated modules defined by the recorded program means 604, 606, 608, and 610, direct the system 100 for implementing system locale management including locale replacement risk analysis of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing system locale management including locale replacement risk analysis in a computer system comprising:

a processor, a Locale Update Risk Analysis Agent (RAA) tangibly embodied in a non-transitory machine readable medium used to implement locale replacement risk analysis;

said processor using said Locale Update Risk Analysis Agent (RAA), scanning globalization API usages on each pair of locale and running applications; comparing the scanned API list with predefined API locale sensitive weights, and calculating a locale replacement risk index on each application under a certain locale and making a living locale-object update decision based on the calculated locale replacement risk indexes; identifying running applications not ready for the living locale-object update decision, moving the identified not ready running applications to another node; deploying a living local object update session in a targeted node, and applying an original locale object file set.

2. The apparatus as recited in claim 1 includes a Locale Replacement Risk Examiner (LRRE), and evaluating locale-object replacement risks on a certain pair of application and locale.

3. The apparatus as recited in claim 2 includes a Locale-Object Management Daemon (LOMD) receiving an output of the Locale Replacement Risk Examiner (LRRE) used to make the living locale-object update decision.

4. The apparatus as recited in claim 1 includes a Living Locale-Object Update Profile (LLOU), said processor using said Living Locale-Object Update Profile (LLOU), saving and updating the calculated locale replacement risk index into one or more living locale-object update profiles.

5. The apparatus as recited in claim 1 includes a Running Application Status File (RASF), said processor using said Running Application Status File (RASF), saving and updating the calculated locale replacement risk index into the running application status file.

6. The apparatus as recited in claim 1 includes a Locale-Object Management Daemon (LOMD), said processor using said Locale-Object Management Daemon (LOMD) invoking the locale object management daemon to make the living locale-object update decision based on the locale replacement risk indexes stored in a living locale-object update profile.

7. The apparatus as recited in claim 1 includes said processor using said updating and saving application status into one or more living locale-object update profiles, and sharing living locale-object update profiles with other nodes as crowdsourcing contribution to other users.

8. The apparatus as recited in claim 1 includes a Table of Running Applications and Correlated Loaded Locale-Objects (TRACLLO), said processor using said Table of Running Applications and Correlated Loaded Locale-Objects (TRACLLO) storing running application status information under certain locales into the Table of Running Applications and Correlated Loaded Locale-Objects (TRACLLO).

9. The apparatus as recited in claim 1 includes a General Globalization API List (GGAPIL), and each API being rated in different risk levels based upon predetermined parameters, said predetermined parameters include at least one of application type, business mode, language, and locale names.

10. A computer-implemented method for implementing system locale management including locale replacement risk analysis in a computer system including a processor, and a Locale Update Risk Analysis Agent (RAA) tangibly embodied in a non-transitory machine readable medium used to implement locale replacement risk analysis, said computer-implemented method comprising:

scanning globalization API usages on each pair of locale and running applications; and, comparing the scanned API list with predefined API locale sensitive weights, and calculating a locale replacement risk index on each application under a certain locale;

making a living locale-object update decision based on the calculated locale replacement risk indexes;

identifying running applications not ready for the living locale-object update decision, moving the identified not ready running applications to another node;

deploying a living local object update session in a targeted node, and applying an original locale object file set.

11. The method as recited in claim 10 includes rating API usages being rated in different risk levels based upon predetermined parameters using a General Globalization API List (GGAPIL); said predetermined parameters including at least one of application type, business mode, language, and locale names.

12. The method as recited in claim 10 includes evaluating locale-object replacement risks on a certain pair of application and locale using a Locale Replacement Risk Examiner (LRRE).

13. The method as recited in claim 12 includes making the living locale-object update decision based on the locale replacement risk indexes stored in a living locale-object update profile using a Locale-Object Management Daemon (LOMD).

14. The method as recited in claim 13 wherein the Locale-Object Management Daemon (LOMD) receives an output of the Locale Replacement Risk Examiner (LRRE) used to make the living locale-object update decision.

15. The method as recited in claim 10 includes saving and updating the calculated locale replacement risk index into one or more living locale-object update profiles using a Living Locale-Object Update Profile (LLOU).

16. The method as recited in claim 10 includes saving and updating the calculated locale replacement risk index into the running application status file using a Running Application Status File (RASF).

17. The method as recited in claim 10 includes storing running application status information under certain locales using a Table of Running Applications and Correlated Loaded Locale-Objects (TRACLLO).

* * * * *